(12) United States Patent
Hagan

(10) Patent No.: US 6,341,301 B1
(45) Date of Patent: Jan. 22, 2002

(54) EXCLUSIVE MULTIPLE QUEUE HANDLING USING A COMMON PROCESSING ALGORITHM

(75) Inventor: Stephen C. Hagan, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/781,462

(22) Filed: Jan. 10, 1997

(51) Int. Cl.⁷ .................................................. G06F 9/00
(52) U.S. Cl. ........................................ 709/100; 709/107
(58) Field of Search ................................ 709/100, 101, 709/102, 103, 104, 234, 315, 314, 107; 710/100, 112, 52, 54; 711/170, 147; 712/246

(56) References Cited

U.S. PATENT DOCUMENTS

| | | | |
|---|---|---|---|
| 4,038,642 A | 7/1977 | Bouknecht et al. ......... 364/900 |
| 4,429,360 A | 1/1984 | Hoffman et al. ........... 364/200 |
| 4,663,706 A | 5/1987 | Allen et al. .............. 364/200 |
| 4,807,111 A | 2/1989 | Cohen et al. ............. 364/200 |
| 4,821,170 A | 4/1989 | Bernick et al. ............ 364/200 |
| 4,945,548 A | 7/1990 | Iannarone et al. ............ 375/4 |
| 5,003,464 A | 3/1991 | Ely et al. ............... 364/200 |
| 5,023,776 A | 6/1991 | Gregor .................. 364/200 |
| 5,224,215 A | 6/1993 | Disbrow .................. 395/250 |
| 5,239,634 A | 8/1993 | Buch et al. ............... 395/400 |
| 5,274,823 A | 12/1993 | Brenner et al. ............ 395/725 |
| 5,313,587 A | 5/1994 | Patel et al. ............... 395/275 |
| 5,313,638 A | 5/1994 | Ogle et al. ............... 395/725 |
| 5,315,707 A | 5/1994 | Seaman et al. ............. 395/250 |
| 5,319,778 A | 6/1994 | Catino .................... 395/600 |
| 5,325,526 A | 6/1994 | Cameron et al. ........... 395/650 |
| 5,327,536 A | * 7/1994 | Suzuki .................... 712/238 |
| 5,341,491 A | 8/1994 | Ramanujan ............... 395/425 |
| 5,363,497 A | 11/1994 | Baker et al. .............. 395/425 |
| 5,381,413 A | 1/1995 | Tobagi et al. ............. 370/85.6 |
| 5,386,514 A | 1/1995 | Lary et al. ............... 395/250 |
| 5,388,215 A | 2/1995 | Baker et al. .............. 395/200 |
| 5,394,547 A | 2/1995 | Correnti et al. ............ 395/650 |
| 5,404,521 A | 4/1995 | Murray ................... 395/650 |
| 5,442,730 A | 8/1995 | Bigus ..................... 395/22 |
| 5,459,839 A | * 10/1995 | Swarts et al. .............. 710/112 |
| 5,485,626 A | * 1/1996 | Lawlor et al. ............. 709/315 |
| 5,519,883 A | 5/1996 | White et al. .............. 395/840 |
| 5,539,893 A | 7/1996 | Thompson et al. ......... 395/449 |
| 5,541,912 A | 7/1996 | Choudhury et al. ......... 370/17 |
| 5,546,391 A | 8/1996 | Hochschild et al. ......... 370/60 |
| 5,551,001 A | 8/1996 | Cohen et al. .............. 395/449 |
| 5,555,396 A | 9/1996 | Alferness et al. ........... 395/474 |
| 5,555,405 A | 9/1996 | Griesmer et al. ........... 395/600 |
| 5,560,034 A | 9/1996 | Goldstein ................. 395/800 |
| 5,579,504 A | 11/1996 | Callander et al. ........... 395/471 |
| 5,581,734 A | 12/1996 | DiBrino et al. ............ 395/496 |
| 5,588,132 A | * 12/1996 | Cardoza ................... 711/148 |
| 5,604,866 A | 2/1997 | Kolb et al. ............ 395/200.13 |
| 5,623,449 A | 4/1997 | Fischer et al. ............. 315/200 |
| 5,740,467 A | 4/1998 | Chmielecki, Jr. et al. ... 395/876 |
| 5,774,745 A | 6/1998 | Ecclesine .................. 395/872 |

* cited by examiner

Primary Examiner—Majid Banankhah (57) ABSTRACT

A multiprocessor data processing system for handling a plurality of queues within the data processing system. Each queue is associated with a pointer. A first queue is designated as the current queue along with a first pointer associated with the first queue. This first pointer is designated as a current pointer. Entries are read within the current queue using the current pointer. In response to a condition requiring a change in queues, the current pointer is stored and another pointer is designated or loaded for use as the current pointer. Entries are read with the new current pointer within a queue associated with that pointer.

27 Claims, 4 Drawing Sheets

EXCLUSIVE MULTIPLE QUEUE HANDLING USING A COMMON PROCESSING ALGORITHM

BACKGROUND OF THE INVENTION

1. Technical Field

The present invention relates generally to the processing of data and in particular to a multi-processor data processing system. Still more particularly, the present invention relates to a method and apparatus for handling queues in a multi-processor data processing system.

2. Description of the Related Art

Multiprocessor data processing systems contain multiple processors that each can operate on its own data. Typically, these processors operate independently of each other, normally on autonomous tasks or significant portions of large tasks. Multiprocessor systems typically fall into two categories: shared-memory systems and distributed-memory systems. In shared memory systems, the processors communicate by reading and writing data to a shared memory location in a common address space. Additionally, shared memory usually implies a shared bus, but such is not necessarily the case. Within the shared memory, communications between various processors are usually performed through queues. Typically, a large number of queues are commonly used by the data processing system to control usable hardware and software resources within the data processing system, including the queues, which are themselves system resources.

Computer systems with multiple central processing units coupled to a memory system often performed queued operations to organize related blocks of stored data. Queues are data structures used to organize sets of data blocks in memory by means of pointers associated with each data block in a queue. Each queue typically includes a number of elements in which each element is a unit of the queue. Queues may be classified into several general types according to the relative locations of the elements in the queue. Contiguous queues have elements physically located next to each other while linear chained queues are queues with elements physically disbursed anywhere within main or virtual storage. Hierarchical chained queues are queues that speed up queue operation by using hierarchical searching.

The data blocks within queues, whether located physically next to each other or disbursed within main or virtual storage, are associated with each other through linked lists. A "doubly linked" list has two pointers in each element, pointing to the next and previous elements in the list. In the case of "singly linked" queues, the pointers reference the addresses of successive data blocks in the queue. A singly linked queue is a queue in which each element includes a pointer to its successor in the queue.

Many software systems use queues to store multiple tasks for processing. In some environments, an event or condition encountered during processing requires a context switch to act on the special condition using a different processing algorithm. A context switch is when a processor begins executing in a different software environment, which could include data types, execution priority, interrupt level, or special algorithms. It is possible to have many types of special conditions, each with a separate algorithm for processing. In many software systems, these special events cannot be handled immediately and multiple occurrences must be queued for subsequent processing, requiring support of multiple queues. For execution speed and memory efficiency, however, it is a benefit to utilize as much common software for queue entry handling (e.g., reading/writing queue entries and updating queue pointers) as possible. This use of common software is especially important for environments with limited processing resources, such as embedded processor subsystems.

Therefore, it would be advantageous to have a method and apparatus for multiple queue handling using a common processing algorithm.

SUMMARY OF THE INVENTION

The present invention is implemented in a multi-processor data processing system and provides a method for handling a plurality of queues within the data processing system. Each queue is associated with a pointer. A first queue is designated as the current queue along with a first pointer associated with the first queue. This first pointer is designated as a current pointer. Entries are read within the current queue using the current pointer. In response to a condition requiring a change in queues, the current pointer is stored and another pointer is designated or loaded for use as the current pointer. Entries are read with the new current pointer within a queue associated with that pointer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
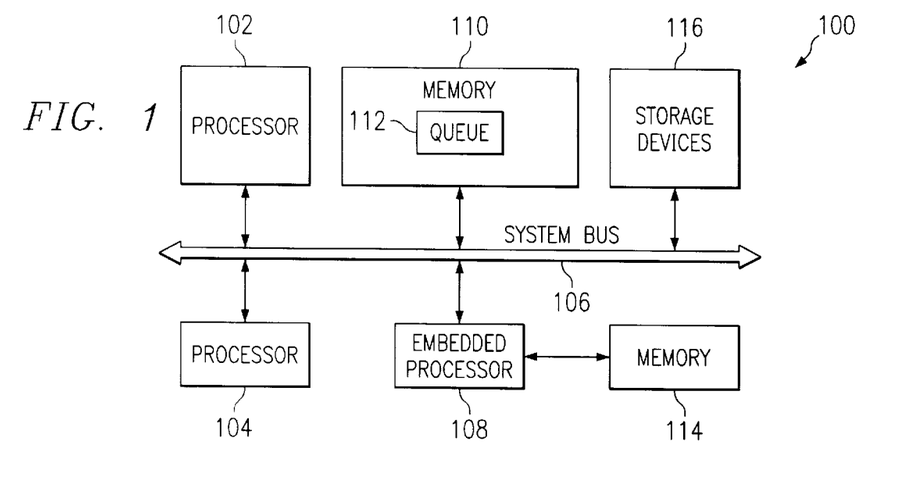
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 includes multiple main processors or central processing units (CPUs): processors 102 and 104, which are connected to system bus 106. System bus 106 may be implemented using various data processing system architectures, such as a peripheral component interconnect (PCI) local bus architecture. Processors 102 and 104 may be implemented using various microprocessors, such as for example, (1) complex instruction set CPUs (CISCs): Intel 80486 and Pentium Processors available from Intel Corporation; Am5$_x$86 Processor from Advanced Micro Devices, Inc.; and Cyrix 6×86 Processor from Cyrix Corporation; and (2) reduced instruction set CPUs (RISCs): DEC Alpha from Digital Equipment Corporation and a PowerPC 604e Processor from Motorola, Inc. Data processing system 100 also includes an embedded processor 108, which is typically found in an adapter, such as a SCSI adapter. Embedded processor 106 may be located on an adapter providing a connection to a hard drive, an array of hard drives and/or a CD-ROM or scanner or tape. Embedded or special purpose processors are found in network controllers, SCSI controllers, IDE controllers, etc.

Instructions for processes and algorithms executed by processors 102 and 104 may be found in memory 110 which may include both volatile and nonvolatile memory devices, such as random access memory (RAM) and read only memory (ROM). Embedded processor 108 also may execute instructions for its processes located in memory 110, which is a shared memory that is used to provide communication between processor 102, processor 104, and embedded processor 108. Embedded or special purpose processors are found in Network controllers, SCSI controllers, IDE controllers, etc.

Alternatively, embedded processor 108 may execute instructions located in a memory 114 associated with embedded processor 108. Memory 114, like memory 110, may include both volatile and non-volatile memory devices, such as RAM and ROM. Unlike memory 110, memory 114 is not a shared memory in the depicted example. The queues manipulated by the various processors in data processing 100 are located in queue block 112 within memory 110. Alternatively, memory 114 could be a shared memory containing queues.

Communication is facilitated through queues found within queue block 112 in memory 110. An output queue (not shown), also called a "start queue", is used to send requests such as input/output (I/O) requests from processors 102 and 104 to embedded processor 108. Similarly, an input queue (not shown), also called a "completion queue", is used to return completion information from embedded processor 108 to processors 102 or 104.

Storage devices 116 are shared storage devices connected to system bus 106 and represent non-volatile storage in the depicted example. In some instances, such as with SCSI drives or SCSI CD-ROMs, storage devices 116 are connected to bus 106 through an adapter containing an embedded processor. This is a secondary type of storage may include, for example, hard disks, CD-ROM, and/or tape drives and their equivalents.

Although in the depicted example in FIG. 1, data processing system 100 contains two main processors, processors 102 and 104, and a single embedded processor 108, other numbers and types of processors may be employed in different combinations according to the present invention. For example, the present invention may be implemented in a data processing system containing a single main processor and a single embedded processor. In other words, the present invention may be applied to data processing systems containing at least two processors that communicate through a shared memory. The shared memory may be located in different places although the depicted example shows the shared memory as memory 110 being connected directly to system bus 106. For example, memory 114 could be a shared memory accessible by other processors within data processing system 100 other than just embedded processor 108.

With reference now to FIGS. 2A–2D, block diagrams of a queue 200 that may be found within queue block 112 in FIG. 1 are depicted according to the present invention. In the depicted example, queue 200 is a circular queue although other types of queues may be implemented according to the present invention. Queue 200 is a data structure containing a list of elements stored in memory within queue block 112. The queue is a "static" queue in the depicted example, defined at initialization with a fixed size. Elements are either active (associated with data to be processed) or empty. The queue entries have indicators that denote the context required to process any particular entry. This mechanism is used in the common queue handling algorithm of the present invention.

In the depicted example, queue 200 is a singly linked list in which each element includes two portions: data 202 and pointer 204. Data 202 is an entry in queue 200 and may contain data that is to be used by processor or data in the form of an address (i.e., a pointer) to a block of data. Each pointer 204 points to the next entry within queue 200. Pointer 204 in the last element, element N, points back to the first element, element 1 to form a circular queue.

A read pointer 206 is employed to point to the element (in the "first" position) currently being read from queue 200 while write pointer 208 points to the element (in the "last" position) in which data is being written into. Write pointer 208 always leads read pointer 206 with both pointers traversing the elements in queue 200 in a circular fashion.

Figure 2A:
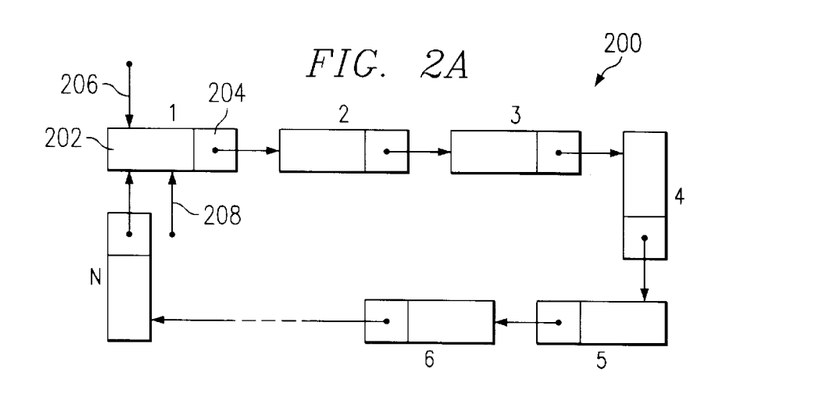
FIGS. 2A–2D depict block diagrams of a queue according to the present invention.
Figure 2B:
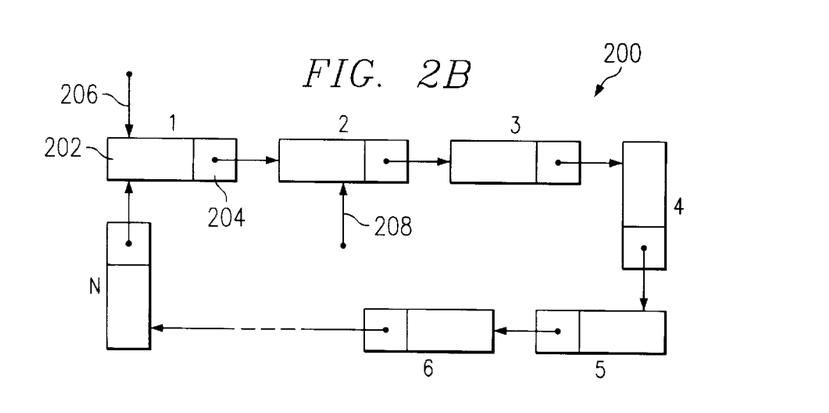
Figure 2C:
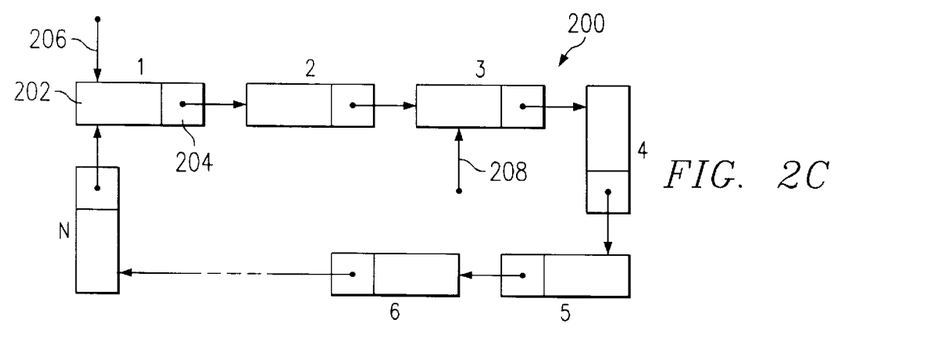
Figure 2D:
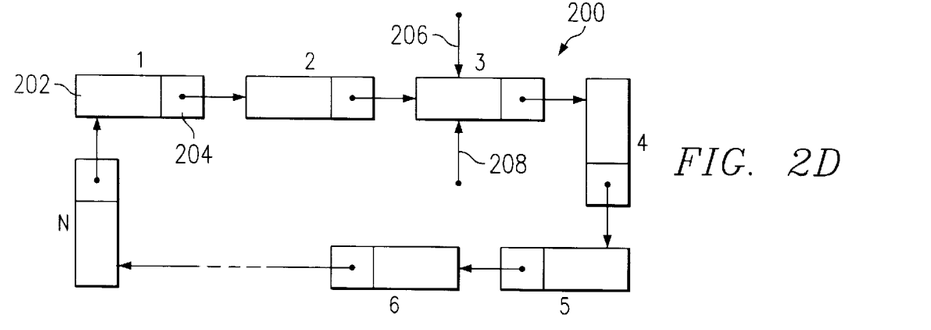

In FIG. 2A, both read pointer 206 and write pointer 208 are pointing to element 1. All elements are empty in queue 200 in FIG. 2A. In FIG. 2B, after the first entry is posted to an element, and before a read occurs, read pointer 206 still points to element 1 while write pointer 208 now points to element 2 within queue 200. After a second item is posted to queue 200, and before a read occurs, read pointer 206 still points to element 1 while write pointer 208 now points to element 3, as illustrated in FIG. 2C. In such a situation, typically the processor reading entries has not yet been notified to read entries from queue 200. In FIG. 2D, both read pointer 206 and write pointer 208 point to entry 3 in queue 200. In this situation, two entries have been posted (written to) elements in the queue and both entries have been read from the queue.

Figure 3:
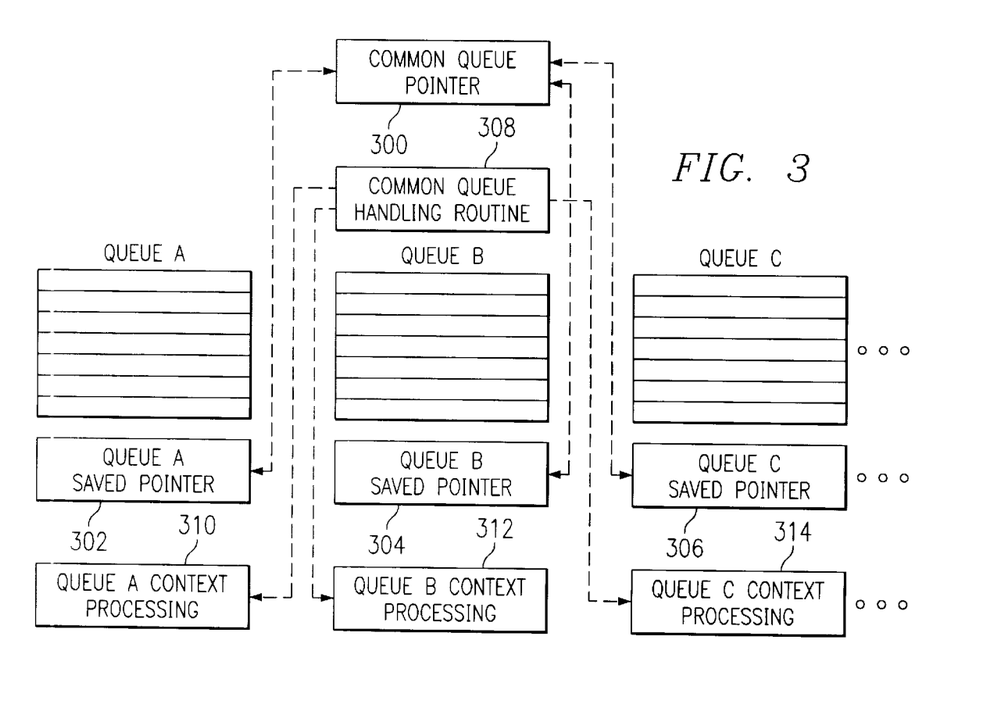
FIG. 3 is a block diagram illustrating the components and processes employed in a common queue handling system according to the present invention.

With reference now to FIG. 3, a block diagram illustrating the components and processes employed in a common queue handling system is illustrated according to the present invention. The common queue handling system is found within memory 110 in the depicted example. The various components of the common queue handling system depicted in FIG. 3 may be placed in various locations other than memory 110. Context processing also may be performed through hardware instead of software components according to the present invention. Only the queues must be located in a shared memory somewhere within the data processing system. Three queues: queue A, queue B, and queue C are employed in FIG. 3. Additional or fewer queues may be used according to the present invention. At system initialization, one of the queues is set up to be the currently active queue, also called the default queue. In the depicted example, queue A is selected as the active or default queue.

Queue A, queue B, and queue C are circular queues in the depicted example, such as queue 200 in FIG. 2. The last element of each queue has a pointer pointing back to the first element in the queue. The read pointer of queue A is placed in common queue pointer 300. Each queue has a saved pointer location associated with it. Queue A is associated with saved pointer location 302; queue B is associated with saved pointer location 304; and queue C is associated with saved pointer location 306. The initial read pointer for queue B is placed into saved pointer location 304, and the initial read pointer for queue C is placed into saved pointer location 306. Initially, no read pointer is stored in saved pointer location 302 because queue A is the default or active queue. As mentioned before, its read pointer is stored within common queue pointer 300 for use by common queue handling routine 308.

Entries may be placed into elements in the queues using write queue pointers to point to the element into which data forming the entries is to be placed. The methods used for putting entries into these queues may be performed using various known processes. In the depicted example, entries may be entered by other processors, by the local processor, which is the process on which the queue handling routine is executing in the depicted example, or by queue context processing units, such as context processing units 310, 312, or 314, which are associated with queue A, queue B, and queue C, respectively. Context processing units 310, 312, and 314 are routines or programs employed to process data or instructions pointed to by entries within queue A, queue B, and queue C.

Common queue handling routine 308 is called when one or more entries have been placed on queue A. Common queue handling routine 308 reads the first queue entry in queue A, decodes the proper processing context for queue A (using an indicator embedded in the queue entry, i.e., a semaphore), and transfers execution to a context processing unit. In the depicted example, normal processing without exceptions is performed by context processing unit 310. Assuming no exception conditions occur, when the context processing by context processing unit 310 completes, execution returns to common queue handling routine 308 to read the next queue entry in queue A. If queue A is empty, common queue handling routine 308 can return or enter an idle condition until additional entries are placed into the currently active queue.

During processing of entries within queue A, the occurrence of an exception condition within an entry typically results in processing of that entry by different context processing unit. In response to such an exception condition, a switch in the context processing unit is initiated by the context processing unit handling the current entry. The determination of conditions for context which is in the priority of the queue processing is the responsibility of each context processing unit. No restrictions are placed on how these decisions are made, in the depicted example, as long as each context processing routine adheres to the common queue switching method described below.

For example, if an exception condition occurs in context processing unit 310, and a determination is made that the exception is to be handled by context processing unit 312, a context switch is initiated. Entries for exception processing are placed in queue B, associated with context processing unit 312, which processes this type of exception. The initiation of the context switch to context processing unit 312 occurs by context processing unit 310 storing the common queue pointer into saved pointer location 302 for its process. Then, context processing unit 310 loads the saved pointer from saved pointer location 304 into common queue pointer 300 for the context to switch to context processing unit 312 with processing of entries within queue B. After the loading of the saved pointer into common queue pointer 300, the execution is returned to common queue handling routine 308. In the depicted example, the pointer in common queue pointer 300 now points to queue B, resulting in entries being read from queue B. The indicators in the queue entries have indicators to use context processing unit 312 instead of context processing unit 310.

Processing continues on entries in queue B managed by common queue handling routine 308 just as with entries in queue A, except that context processing unit 312 is used with queue B. If an exception occurs requiring a context switch determined solely by context processing unit 312, the switch can be made as described above. In the depicted example, when queue B becomes empty, context processing unit 312 initiates a context switch back to context processing unit 310 to process entries in queue A. Alternatively, when the queue is empty, the process would idle until more entries are posted to queue B.

No additional entries in queue A are processed until a context switch back to queue A is performed. Thus, if queue B becomes empty, common queue handling routine 308 initiates a context switch back to queue A. When a switch is made back to queue A, determined by common queue processing block 312, the read pointer for queue B in common queue pointer 300 is stored into saved pointer location 304. The read pointer is restored from saved pointer location 302 and placed into common queue pointer 300, causing queue processing of queue A to resume from the point it was interrupted by the occurrence of an exception. Further, the writing of additional queue entries into queue A or any of the other queues in FIG. 3 may occur while context processing or context switching is performed. Although the depicted example shows context switches in response to exception conditions, context switches may occur under other conditions.

Thus, a high degree of flexibility in the determination of conditions for a context switch, prior to a prioritization of events, and nesting of processing is provided by this common queue handling system. Exceptions in context processing unit 312 can cause a context switch to queue C with processing of queue C occurring through context processing unit 314. Such a process may be extended to any number of queues and any context processing unit can cause a switch to another queue. The context processing unit also decides how to proceed on an empty queue indication. Some options in response to an empty queue indication are to perform a context switch to the processing of another queue, return control to a parent function or process, or enter an auto-condition waiting for new entries.

In particular, the common queue handling system depicted in FIG. 3 may be implemented in an embedded SCSI I/O processor. For such an implementation, queue A would be used for SCSI I/O events, and queue B for level 1 exceptions, such as, for example, check condition or other bad status. Queue C would be used for level 2 exceptions, such as, for example, abort, device reset, or terminate I/O, and so on. Whenever an exception occurs, context processing unit 310 would determine the exception level, post the entry on the respective queue, and cause a context switch to the context processing unit for that queue. Other processors or processes also could post exceptions to the queues and notify context processing unit 310 to perform the context switch. In response to performing the context switch, all normal processing stops until exceptions of the selected level are processed. Any new exceptions of a higher level would immediately cause a context switch to that higher level. Once the queue for a particular exception level becomes empty, the context processing unit for that exception level would switch to the next lower exception level to initiate processing of exceptions on that exception level. Even though no exceptions may be exist on a given exception level, the context switches would traverse down levels until all exceptions were handled and normal SCSI I/O events were once again being processed.

In the depicted example, each of the entries within a queue were processed by a single context processing unit.

For example, entries within queue A were only processed by context processing unit 310 and not by context processing units 312 or 314. This design is used to implement priorities in handling data and instructions. Alternatively, entries within queue A could be handled by other context processing units other than context processing unit 310. For example, entries within queue A could be handled by context processing units 310 and 312. Data within each entry in the queue indicates which context processing unit is to handle that particular entry.

Figures 4, 5:
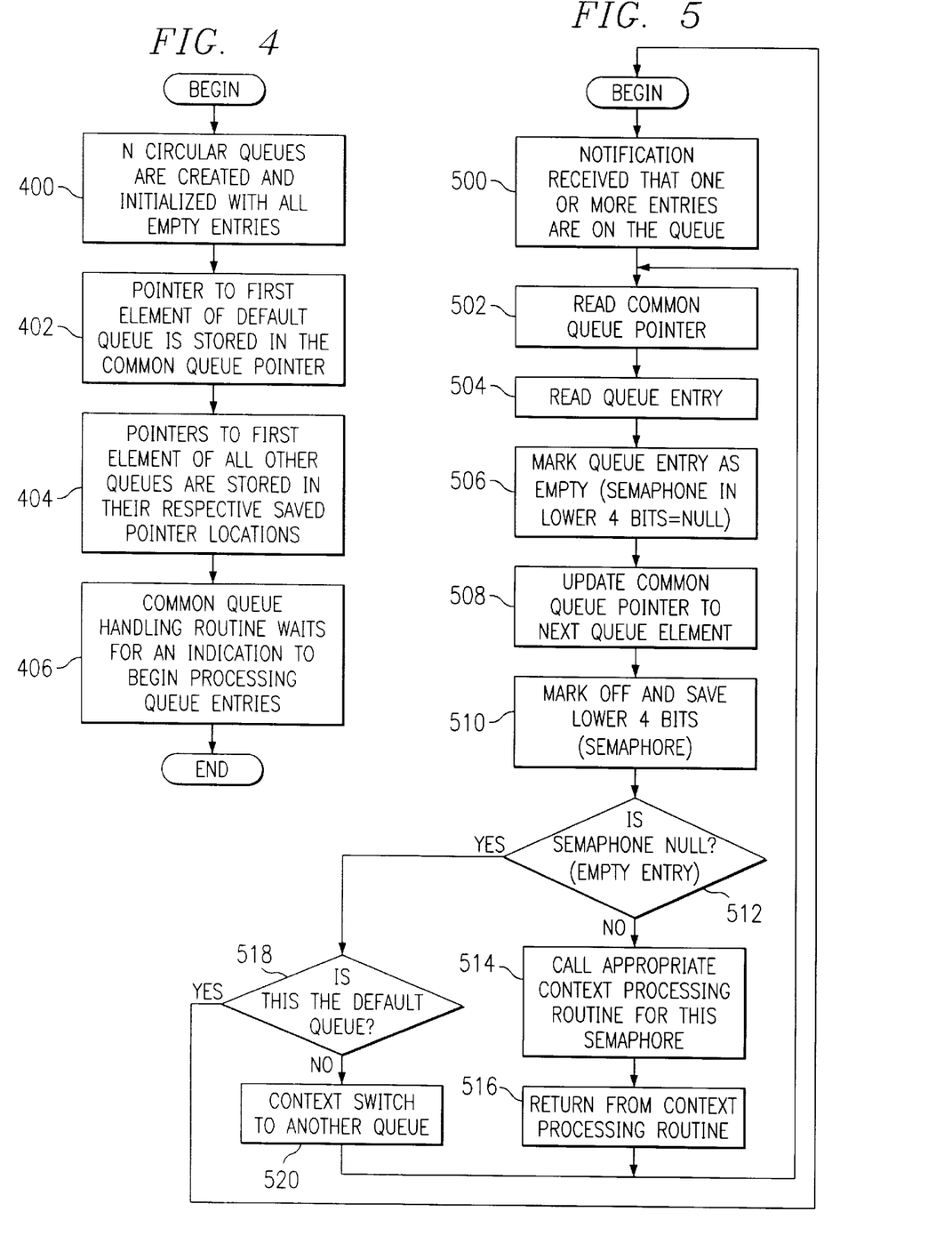
FIG. 4 depicts a flowchart of a process for initializing a common queue handling system according to the present invention.
FIG. 5 is a flowchart of a process executed by a common queue handling routine to process entries in queues according to the present invention.

With reference now to FIG. 4, a flowchart of a process for initializing a common queue handling system is depicted according to the present invention. The process begins by creating N circular queues and initializing these queues with empty entries (step 400). Thereafter, a pointer to the first element of the default queue is stored in the common queue pointer (step 402). The default queue is the queue that is currently active after initialization of the common queue handling system (e.g., queue A in FIG. 3). Next, pointers to the first element of all of the other queues are stored in saved pointer locations (step 404). Then, the common queue handling routine waits for an indication to begin processing queue entries (step 406). An indication may be, for example, an occurrence of an interrupt.

With reference now to FIG. 5, a flowchart of a process executed by a common queue handling routine to process entries in queues is depicted according to the present invention. The process begins by receiving notification that one or more entries are present on the queue (step 500). Thereafter, the common queue pointer is read (step 502) and the queue entry pointed to by the common queue pointer is read (step 504). The entry typically contains data in the form of an address pointing to a block of data and a pointer to the next entry. In the preferred embodiment, the data blocks are aligned on 16-byte boundaries, so the lower 4-bits of the address stored in the queue entry can contain an indicator (semaphore) for context process or an empty entry. The queue entry that has been read is marked as empty (step 506). This may be done by setting the lower 4 bits in the address equal to null. Next, the common queue pointer is updated to point to the next queue element location (step 508). Then, the lower 4 bits of the queue entry read in step 504 are marked off and saved (step 510). The lower 4 bits in the address are the semaphore, which is used to indicate if an entry is empty. This semaphore is also used to indicate which context processing unit should be called, and in some cases, to make a context switch to another queue. In the depicted example, Semaphore=0 (NULL)=empty queue element; Semaphore=1–15=context indicator or queue switch indicator (done by context processing unit).

A determination is then made as to whether the sempahore is null (step 512). This is a determination as to whether the entry is empty. If the semaphore is null, the process then determines whether the queue is the default queue (step 518). If the queue is the default queue, the process returns to step 500 otherwise, the process switches context to another queue (step 520). With reference again to step 512, if the semaphore is not null, the process then calls the appropriate context processing routine for this semaphore (steo 514). Thereafter, the process returns from the context processing routine (step 516) with the process then returning to step 502.

Figure 6:
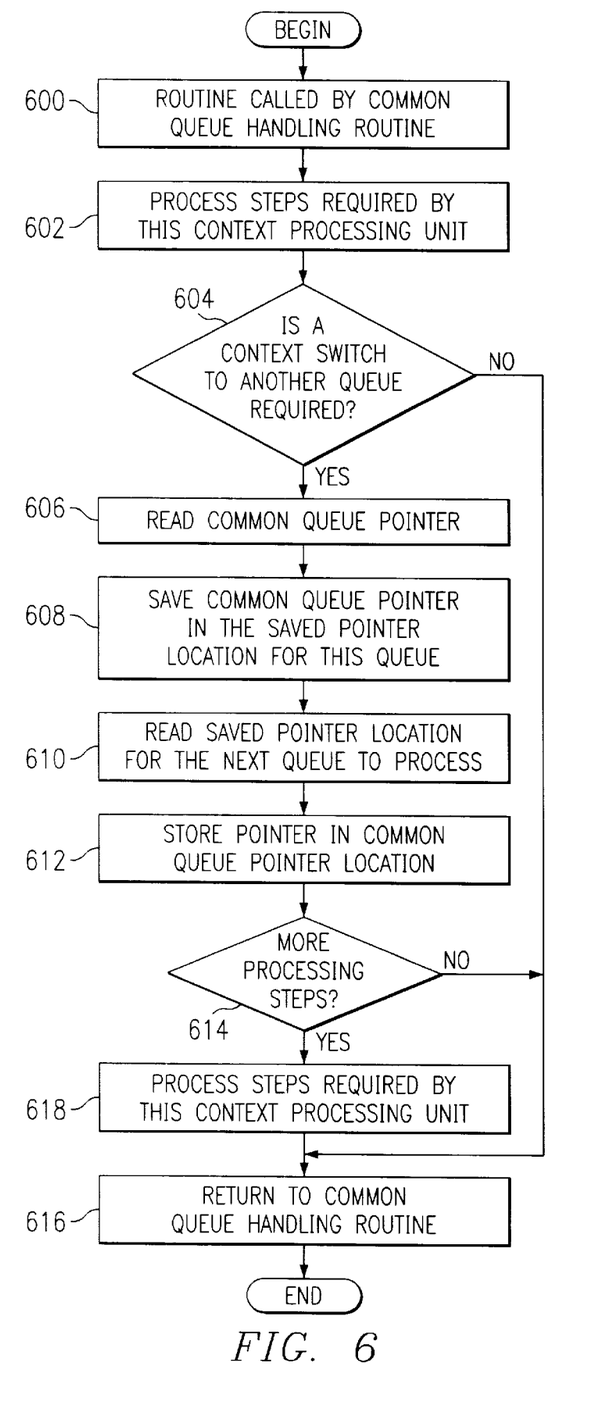
FIG. 6 depicts a flowchart of a process executed by a context processing routine according to the present invention.

With reference now to FIG. 6, a flowchart of a process executed by a context processing routine is depicted according to the present invention. The process begins by the context processing unit being called by the common queue handling routine (step 600). Thereafter, processing steps occur as required by the context processing routine (step 602). A determination is then made as to whether a context switch to another queue is required (step 604). If a context switch to another queue is required, the process then reads the common queue pointer (step 606), and saves the common queue pointer in the saved pointer location for the queue currently being processed (step 608). Thereafter, the saved pointer location for the next queue is read for processing (step 610). This next queue is the queue that is switched to by the context switch. Thereafter, the pointer is stored in the common queue pointer location (step 612). Steps 606 through 612 are the steps employed by the context processing unit handling the context switch to another queue.

Thereafter, a determination is made as to whether more processing steps are required by the context processing unit (step 614). If more steps are present for processing, the process then processes the additional steps required by this context processing unit and then the process returns to the common queue handling routine (step 616) with the process terminating thereafter. The process also proceeds to step 616 from step 604 in response to an absence of a requirement to switch to another queue.

When the process returns to the common queue handling routine after a context switch, the common queue handling routine then points to another queue entry and the context processing unit that is to process that entry is used. The context processing unit for the current queue terminates execution when a context switch to another queue occurs. Since all of these queue handling routines (common routine plus context processing routines) are executing in a serial fashion, only one is executing at any one time. So when a context switch happens, the context processing unit that caused the switch ceases to be in control (executing) until another context switch selects it again.

Thus, the present invention provides an improved method and apparatus for processing queues with a common queue handling routine. To the extent that every context processing unit for queue entries contains common steps, that part of the processing can be consolidated along with the common queue handling routine. This mechanism allows for the use of a single routine to handle exception conditions which are processed similarly to normal events, but with any specialized processing being performed by their respective context processing routines.

In this manner, the present invention provides a single common queue handling routine to manage any number of queues in a mutually exclusive fashion. The present invention allows a context switch between queues to be performed quickly with the movement of two queue pointers. The present invention provides a high degree of flexibility in determining conditions for a context switch or prioritization of queue processing. Any processing common to all queues can be combined with the common queue handling routine to gain further efficiency of execution, maintenance, and memory usage.

The present invention provides a common queue processing routine in which multiple queues are employed to hold tasks or events with each queue referring to a different context for processing its entries. The present invention supports the exclusivity of queue processing, ensuring that only one queue is being processed while others remained locked. In the common queue processing system of the present invention, queue entries stored in queue elements for each queue have the same basic structure to allow common handling routine 308 to perform reads, writes, and queue pointer updates. The present invention indicates a valid queue entry or queue empty condition that is contained either explicitly in the queue entry or by reference. This indication system is common to all of the queues in the system. The values of the queue indicators for a valid queue entry or an empty queue element must be unique for each queue. This unique indicator allows the common queue handling routine to transfer execution to the correct context processing routine. The writing of entries to the queues can occur asynchronously to the common queue handling routine, as long as the writing process or processes check for valid (empty) entries to write to and properly maintain queue write pointers.

Each queue has a saved pointer storage location that holds the current queue pointer for that queue when it has been locked and another queue is being processed. The common queue entry handling routine performs any required queue entry reads, and pointer updates. It also determines the proper processing context based on the queue entry.

It is important to note that while the present invention has been described in the context of a fully functional data processing system, those skilled in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include: recordable type media such as floppy disks and CD-ROMs and transmission type media such as digital and analog communications links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for handling a plurality of queues and a plurality of pointers in a data processing system, wherein each queue within the plurality of queues is associated with a pointer within the plurality of pointers, the method comprising:

designating a first queue within the plurality of queues as a current queue and a first pointer within the plurality of pointers, associated with the first queue, as a current pointer;

reading an entry within the current queue using the current pointer associated with the current queue;

storing the current pointer in response to a condition requiring a change in queues;

designating a second pointer within the plurality of pointers as a current pointer; and reading an entry within a second queue within the plurality of queues associated with the current pointer.

2. The method of claim 1 further comprising:

designating a third pointer as the current pointer in reading an entry within a third queue within the plurality of queues associated with the pointer.

3. The method of claim 1, wherein the condition is an exception condition.

4. The method of claim 1 further comprising:

storing the current pointer in response to a second condition requiring a change in queues; and loading the first pointer as the current pointer and reading an entry in the first queue.

5. The method of claim 4, wherein the condition is an indication that the second queue is empty.

6. The method of claim 1 further comprising:

indicating a condition requiring a change in queues by storing the condition as part of an entry within a queue.

7. The method of claim 6, wherein the condition is in a form of a semaphore.

8. A data processing system comprising:

a plurality of queues, wherein each queue within the plurality of queues has at least one entry;

a plurality of pointers, wherein each pointer within the plurality of pointers is associated with a queue within the plurality of queues, wherein a first queue within the plurality of queues is a current queue and a first pointer within the plurality of pointers, associated with the first queue, is a current pointer;

reading means for reading and entry within the current queue using the current pointer associated with the current queue;

storage means, responsive to a condition requiring a change in queues, for storing the first pointer; and loading means for loading a second pointer as the current pointer, wherein the reading means reads an entry within a queue within the plurality of queues associated with the current pointer.

9. The data processing system of claim 8 further comprising:

designation means for designating a third pointer as a current pointer; and reading means for reading an entry within a third queue within the plurality of queues associated with the current pointer.

10. The data processing system of claim 8, wherein the condition is an exception condition.

11. The data processing system of claim 8 further comprising:

loading means for loading the first pointer as the current pointer, wherein the reading means reads an entry in the first queue in response to a condition requiring a change in queues.

12. The data processing system of claim 11, wherein the condition is an indication that the second queue is empty.

13. The data processing system of claim 12, wherein the condition requiring a change in queues is stored as part of an entry within a queue.

14. The data processing system of claim 13, wherein the condition is in the form of a semaphore.

15. The data processing system of claim 8 further comprising:

a plurality of context processing units, wherein the plurality of context processing units process entries within the plurality of queues.

16. The data processing system of claim 15, wherein each context processing unit within the plurality of context processing units is assigned to process entries within a queue within the plurality of queues.

17. A data processing system comprising:

a first processor, the first processor posting entries to a queue;

a second processor, the second processor reading entries from the queue;

a memory containing the queue; and a common queue handling routine having a plurality of modes of operation including:
- a first mode of operation in which a first queue within the plurality of queues is initialized as a current queue and a first pointer within the plurality of pointers, associated with the first queue, is initialized as a current pointer;
- a second mode of operation in which an entry with the current queue is read using the current pointer;
- a third mode of operation in which the current pointer is saved in response to a condition requiring a change in queues; and
- a fourth mode of operation, responsive to the third mode of operation, in which a second queue in the plurality of queues is designated as the current queue and a second pointer, associated with the second queue is designated as the current pointer.

18. The data processing system of claim 17, wherein the common queue handling routine is executed by the first processor.

19. The data processing system of claim 17, wherein the common queue handling routine is executed by the second processor.

20. The data processing system of claim 17 further comprising a third processor, wherein the common queue handling routine is executed by the third processor.

21. The data processing system of claim 17 further comprising:
- a plurality of context processing units, wherein the plurality of context processing units process entries within the plurality of queues.

22. The data processing system of claim 21, wherein each context processing unit with the plurality of context processing unit with the plurality of context processing units is assigned to process entries within a single queue within the plurality of queues.

23. An article of manufacture comprising:
- a computer readable media containing computer readable instructions for handling queues in a computer, the computer readable instructions including:
  - first instructions for initializing a first queue within a plurality of queues as a current queue and a first pointer within a plurality of pointers, associated with the first queue, as a current pointer;
  - second instructions for reading the current queue using the current pointer;
  - third instructions for saving the current pointer in response to a condition requiring a change in queue; and
  - fourth instructions for designating a second queue within the plurality of queues as the current queue and a second pointer within the plurality of pointers as the current pointer.

24. The article of manufacture of claim 23, wherein the computer readable media is a floppy disk.

25. The article of manufacture of claim 23, wherein the computer readable media is a CD-ROM.

26. The article of manufacture of claim 23, wherein the computer readable media is a random access memory.

27. The article of manufacture of claim 23, wherein the computer readable media is a hard disk drive.

* * * * *